(12) United States Patent
Tsunoda et al.

(10) Patent No.: US 11,640,553 B2
(45) Date of Patent: May 2, 2023

(54) METHOD FOR ANALYZING TIME-SERIES DATA BASED ON MACHINE LEARNING AND INFORMATION PROCESSING APPARATUS

(71) Applicant: FUJITSU LIMITED, Kawasaki (JP)

(72) Inventors: Tomoyuki Tsunoda, Kawasaki (JP); Yoshiaki Ikai, Fujisawa (JP); Junji Kaneko, Mishima (JP)

(73) Assignee: FUJITSU LIMITED, Kawasaki (JP)

( * ) Notice: Subject to any disclaimer, the term of this patent is extended or adjusted under 35 U.S.C. 154(b) by 425 days.

(21) Appl. No.: 16/661,358

(22) Filed: Oct. 23, 2019

(65) Prior Publication Data
US 2020/0160216 A1 May 21, 2020

(30) Foreign Application Priority Data
Nov. 21, 2018 (JP) .............................. JP2018-218685

(51) Int. Cl.
*G06N 20/00* (2019.01)
(52) U.S. Cl.
CPC .................... *G06N 20/00* (2019.01)
(58) Field of Classification Search
CPC ........ G06N 20/00; G06N 20/10; G06N 20/20; G06N 7/00; G06N 7/02; G06N 7/04; G06N 5/00; G06N 5/02; G06N 5/04; G06N 5/022
See application file for complete search history.

(56) References Cited

U.S. PATENT DOCUMENTS

2017/0147946 A1    5/2017  Umeda

FOREIGN PATENT DOCUMENTS

| JP | 11-142425 | 5/1999 |
| JP | 2017-097643 | 6/2017 |
| JP | 2018-92349 | 6/2018 |
| WO | 2006/137142 A1 | 12/2006 |

OTHER PUBLICATIONS

Pereira et al. "Persistent homology for time series and spatial data clustering", Apr. 16, 2015, https://www.sciencedirect.com/science/article/pii/S0957417415002407 (Year: 2015).*
Brandstater et al. "Strange attractors in weakly turbulent Couette-Taylor flow", Mar. 1987, https://journals.aps.org/pra/pdf/10.1103/PhysRevA.35.2207 (Year: 1987).*

(Continued)

*Primary Examiner* — Kamran Afshar
*Assistant Examiner* — Shoun J Abraham
(74) *Attorney, Agent, or Firm* — Fujitsu Patent Center

(57) ABSTRACT

A machine learning method includes: generating, by a computer, a sine wave using a basic period of input data having a periodic property; determining a sampling period based on a degree of roundness of an attractor generated from the sine wave; sampling the input data at the determined sampling period to generate a pseudo attractor; and performing a machine learning by using the pseudo attractor.

9 Claims, 19 Drawing Sheets

(56) References Cited

OTHER PUBLICATIONS

Hediger et al. "Characterizing attractors using local intrinsic dimensions calculated by singular-value decomposition and information-theoretic criteria", May 1990, https://journals.aps.org/pra/pdf/10.1103/PhysRevA.41.5325 (Year: 1990).*

Li et al. "Attractor radius and global attractor radius and their application to the quantification of predictability limits", Nov. 24, 2017 https://link.springer.com/article/10.1007/s00382-017-4017-y (Year: 2017).*

Dirafzoon et al. "Action classification from motion capture data using topological data analysis", 2016 https://ieeexplore.ieee.org/abstract/document/7906043 (Year: 2016).*

Venkataraman et al. "Persistent homology of attractors for action recognition", Sep. 2016 https://ieeexplore.ieee.org/abstract/document/7533141 (Year: 2016).*

Bruillard et al. "Anomaly Detection Using Persistent Homology", Apr. 2016 https://ieeexplore.ieee.org/abstract/document/7942418 (Year: 2016).*

* cited by examiner

RADIUS:0

RADIUS:$r_1$

RADIUS:$r_2$

RADIUS:$r_3$

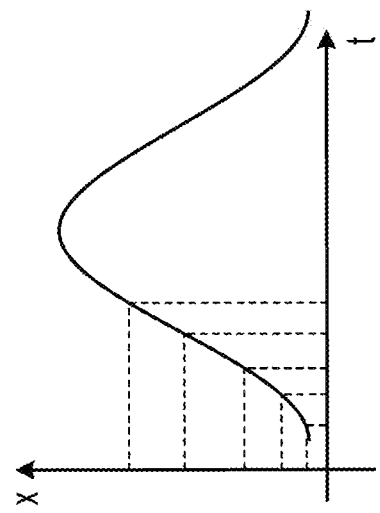
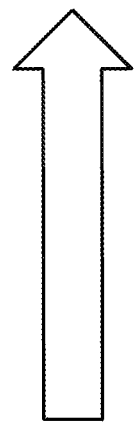
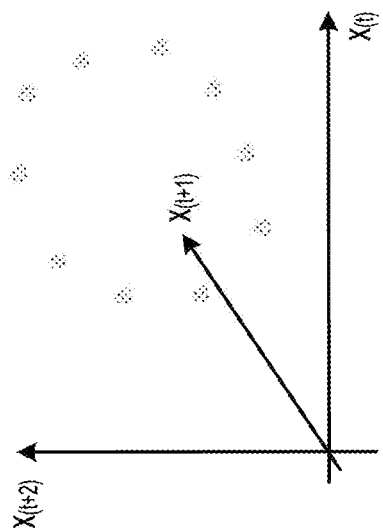
FIG. 12A

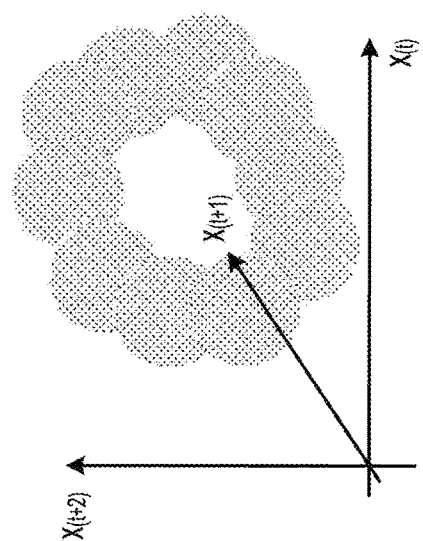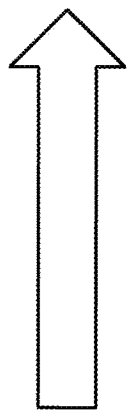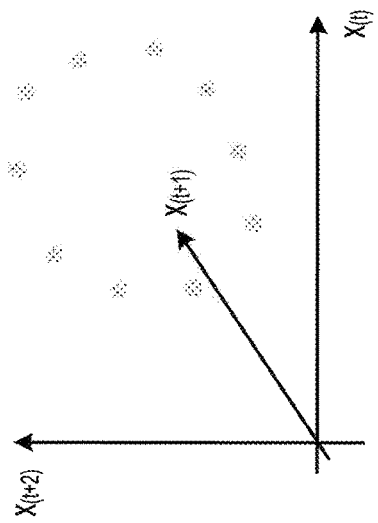
FIG. 12B

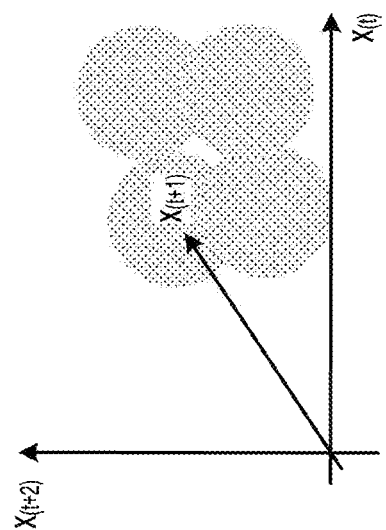
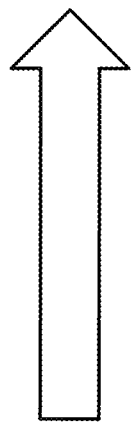
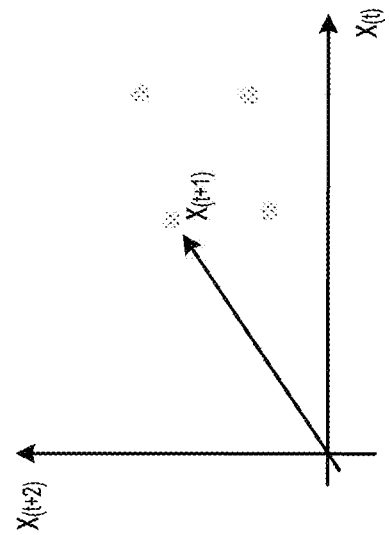
FIG. 12C

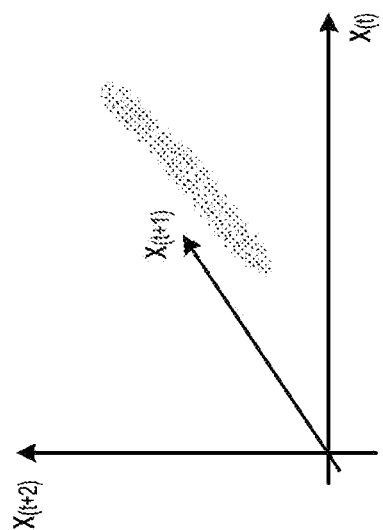
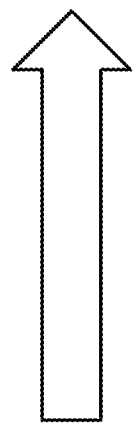
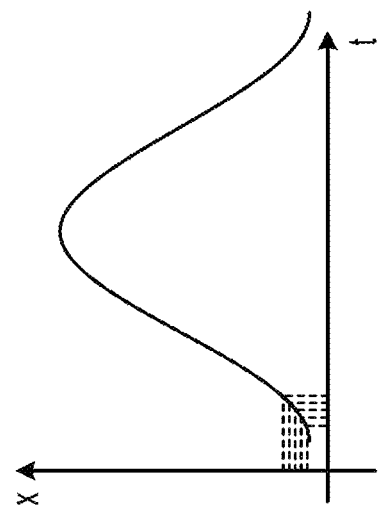
FIG. 15A

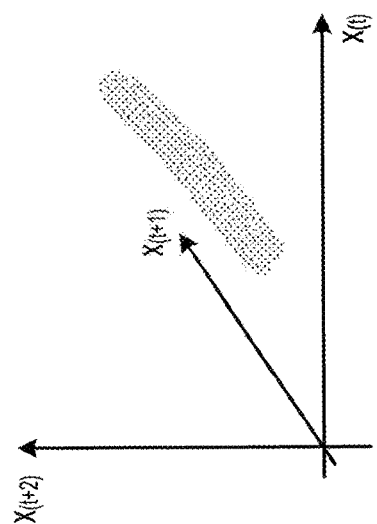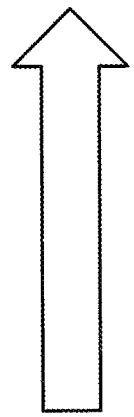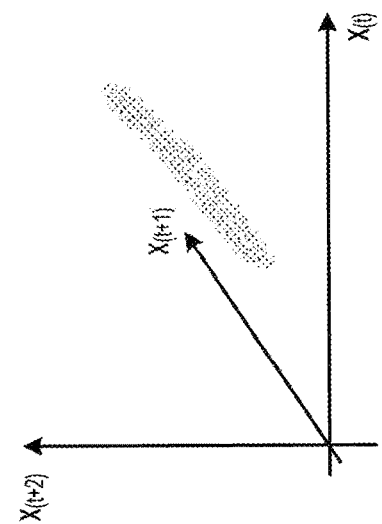
FIG. 15B

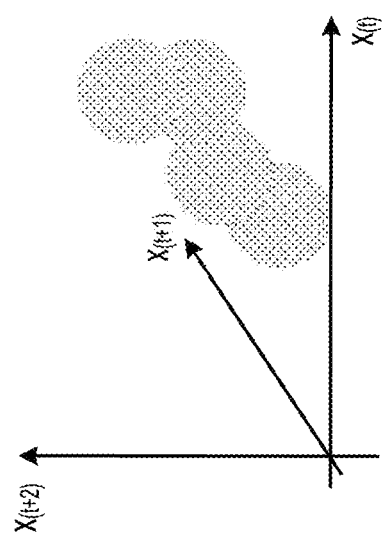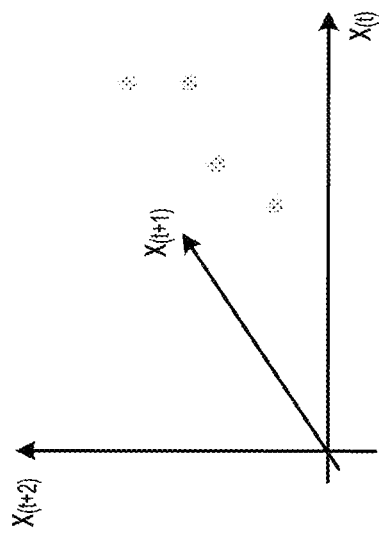
FIG. 15C

METHOD FOR ANALYZING TIME-SERIES DATA BASED ON MACHINE LEARNING AND INFORMATION PROCESSING APPARATUS

CROSS-REFERENCE TO RELATED APPLICATION

This application is based upon and claims the benefit of priority of the prior Japanese Patent Application No. 2018-218685, filed on Nov. 21, 2018, the entire contents of which are incorporated herein by reference.

FIELD

The embodiments discussed herein are related to a machine learning method and an information processing apparatus.

BACKGROUND

There is known an analysis method using the topological data analysis (TDA), as a technology of analyzing time-series data and detecting a variance corresponding to an abnormality of data. For example, time-series data is taken as an input, and a persistent homology (PH) conversion is performed on pseudo attractors which are finite number of attractors generated from the data divided into small sections, so as to obtain the Betti numbers. Then, a machine learning is performed taking Betti sequences using the Betti numbers as feature vectors, so as to generate a learning model, Thereafter, an abnormality is detected from time-series data using the learning model that has been learned.

Related techniques are disclosed in, for example, International Publication Pamphlet No. WO 2006/137142, and Japanese Laid-open Patent Publication No. 11-142425, Japanese Laid-open Patent Publication No. 2018-092349, and Japanese Laid-open Patent Publication No. 2017-097643.

Generally, when time-series data is acquired from a sensor or the like, a short sampling period is often adopted in order to thoroughly capture the feature of targeting phenomenon. However, when the time-series data is converted into pseudo attractors, in a case where the sampling for the phenomenon desired to be focused is excessively fine or coarse, a useful feature may not be extracted, thereby, adversely affecting the generation of feature vectors.

Specifically, when the sampling period of data from which pseudo attractors are generated is excessively short, the pseudo attractors have a shattered shape, and the Betti sequences generated using the PH conversion may not accurately represent the feature. As a result, the difference between normal data and abnormal data becomes obscure.

FIGS. 15A to 15C are views for explaining a problem in an oversampling. As illustrated in FIG. 15A, since an oversampling occurs when the sampling period is relatively short, similar data is intensively extracted and the shape of pseudo attractors becomes linear. That is, since the pseudo attractors have a certain time "t" and subsequent times t+1 and t+2 as dimensions, when the oversampling occurs, similar data is extracted at each time of sampling. Thus, as illustrated in FIG. 15B, when the shape of pseudo attractors becomes linear, data point sets are immediately connected to each other and holes are immediately collapsed at the time of the PH conversion, and as a result, the feature may not be accurately extracted. Further, when the oversampling occurs, since the data sets are linearly formed so that holes are hardly formed as illustrated in FIG. 15C, the feature may not be accurately extracted.

Meanwhile, while it may be conceived to search for an appropriate sampling interval manually by a repetitive work, such a work may not be practical because the work is random and requires time.

SUMMARY

According to an aspect of the embodiments, a machine learning method includes: generating, by a computer, a sine wave using a basic period of input data having a periodic property; determining a sampling period based on a degree of roundness of an attractor generated from the sine wave; sampling the input data at the determined sampling period to generate a pseudo attractor; and performing a machine learning by using the pseudo attractor.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 12A is a view for explaining effects;

FIG. 12B is a view for explaining effects;

FIG. 12C is a view for explaining effects;

FIG. 15A is a view for explaining a problem in an oversampling;

FIG. 15B is a view for explaining a problem in an oversampling; and

FIG. 15C is a view for explaining a problem in an oversampling.

DESCRIPTION OF EMBODIMENTS

Hereinafter, embodiments of the present disclosure will be described in detail based on the accompanying drawings.

Meanwhile, the present disclosure is not limited to the embodiments. In addition, the embodiments may be appropriately combined with each other within the scope that does not cause any inconsistency.

The First Embodiment

<Description of Learning Device>

Figure 1:
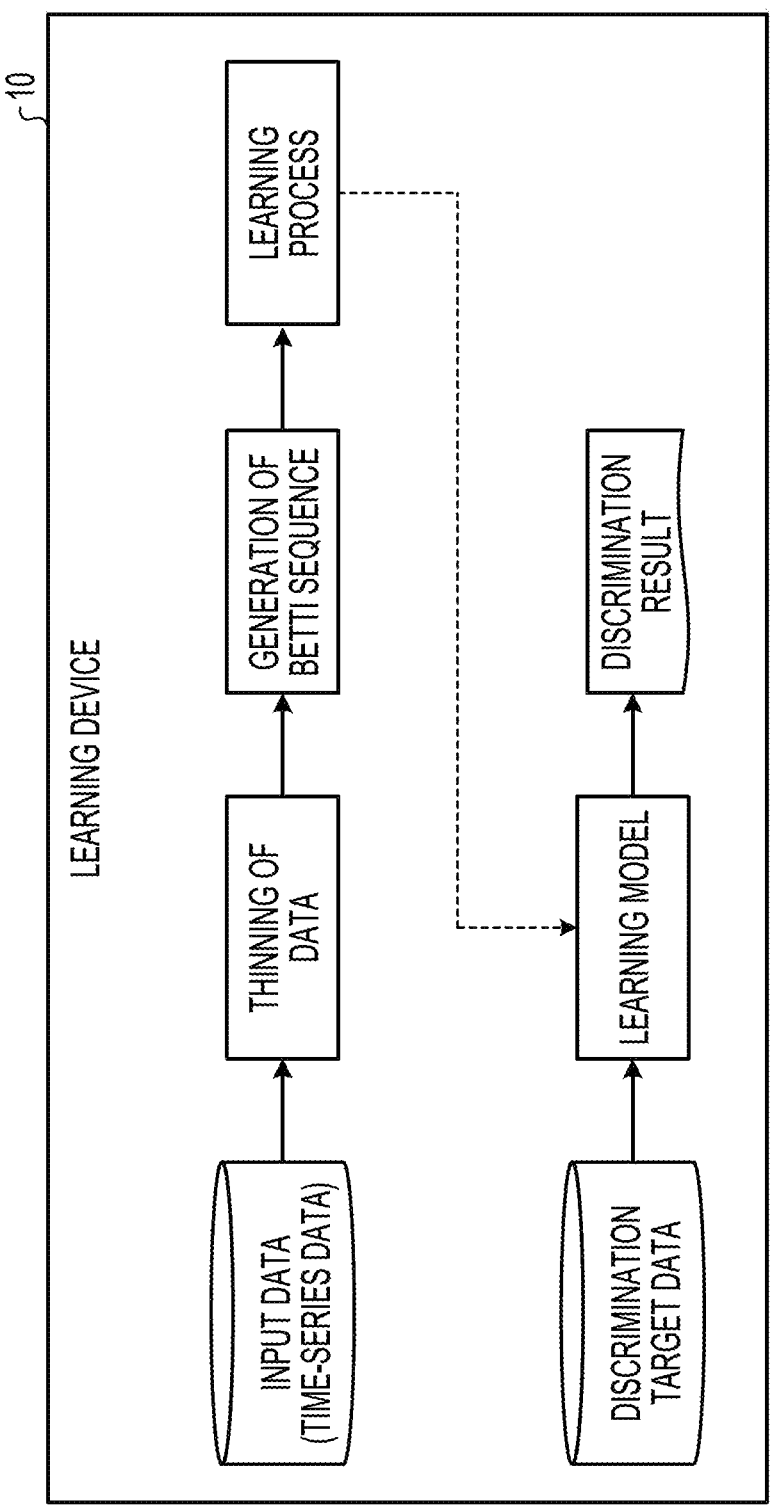
FIG. 1 is a diagram illustrating a learning device according to a first embodiment.

FIG. 1 is a view for explaining a learning device 10 according to the first embodiment. The learning device 10 illustrated in FIG. 1 is an example of a computer device that performs a machine learning. Specifically, the learning device 10 takes time-series data which is an example of data having a periodic property as input data, thins data out from the input data at an appropriate interval, and generates learning data. Then, the learning device 10 performs a PH conversion on the learning data, to generate pseudo attractors and Betti sequences.

Thereafter, the learning device 10 performs a learning process using a machine learning, a deep learning (DL) or the like with the Betti sequences as feature quantities, and learns a neural network (NW), etc., in order to be able to correctly discriminate (classify) the learning data according to each event.

For example, the learning device 10 generates a Betti sequence from each of multiple pieces of time-series data, and extracts time-series data in which events have changed from those in other time-series data, based on the Betti sequences. Then, the learning device 10 performs a learning to be able to discriminate the events corresponding to the normal time-series data over the events corresponding to the time-series data in which the change is detected. Thereafter, when performing the discrimination after completing the learning, the learning device 10 also performs the thinning as described above on discrimination target data as well, and then, inputs the thinned-out data to the learning model to which the learning result is applied, so as to implement an accurate estimation of the events (labels) of the discrimination target data.

The learning device 10 obtains a relationship between a frequency and a sampling period for effectively expressing the feature of pseudo attractors, from a basic waveform. Then, the learning device 10 determines a frequency to be focused in the analysis target data, from dominant frequency components, etc., of the analysis target data. Thereafter, the learning device 10 calculates a necessary sampling period from the determined frequency and the obtained relationship, so as to be able to automatically determine an optimum subsampling interval.

As a result, the learning device 10 may suppress the oversampling, and may suppress the adverse effect of the process of generating pseudo attractors on the machine learning. Meanwhile, in the first embodiment, descriptions are made on an example where the learning device 10 performs both the learning process for generating a learning model and the discrimination process using the learning model. However, the learning process and the discrimination process may be implemented by separate devices.

<Functional Configuration of Learning Device>

Figure 2:
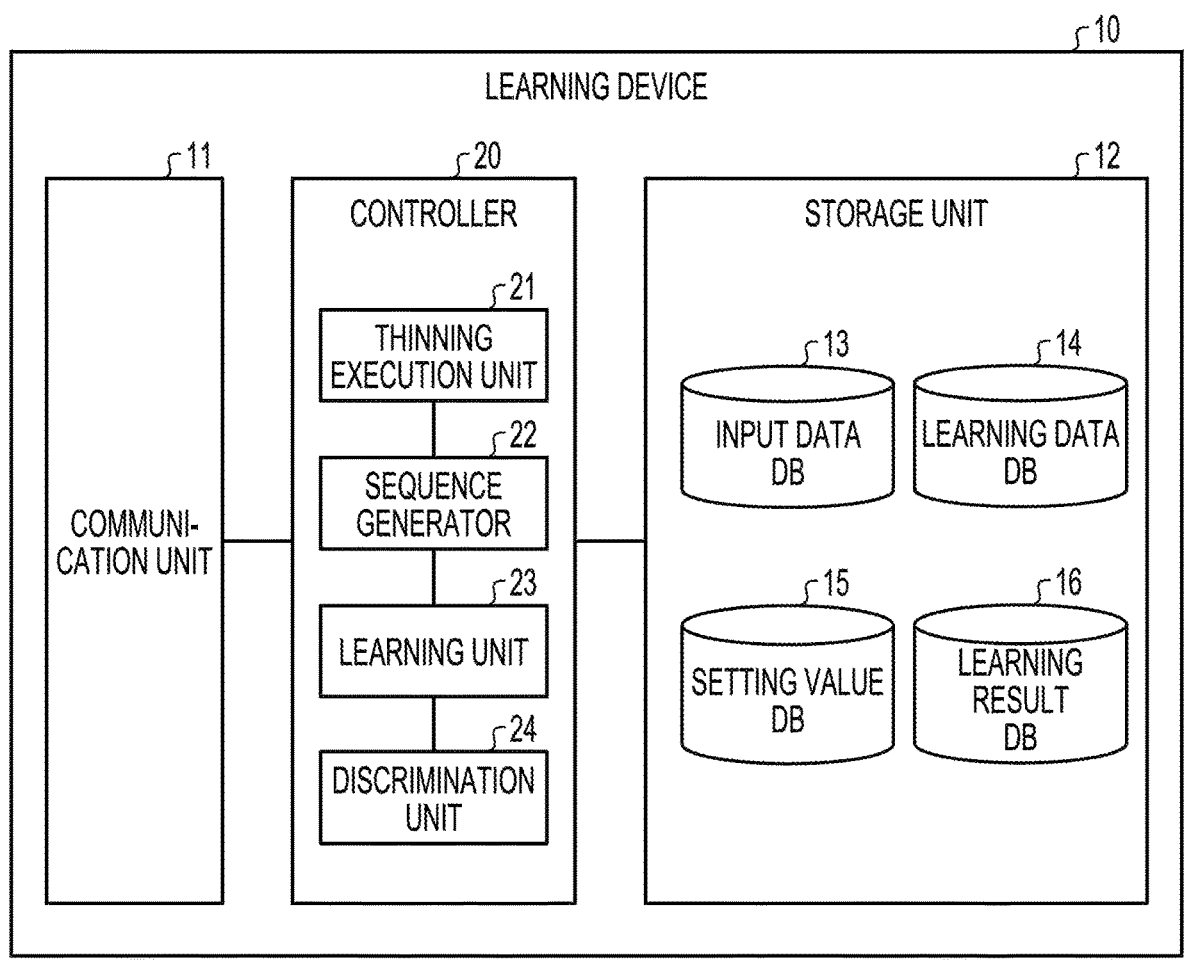
FIG. 2 is a functional block diagram illustrating a functional configuration of the learning device according to the first embodiment.

FIG. 2 is a functional block diagram illustrating a functional configuration of the learning device 10 according to the first embodiment. As illustrated in FIG. 2, the learning device 10 includes a communication unit 11, a storage unit 12, and a controller 20.

The communication unit 11 is a processing unit that controls a communication with other devices and is, for example, a communication interface or the like. For example, the communication unit 11 receives time-series data, which is input data, or discrimination target data from a management device or the like, and transmits a learning result, a discrimination result, etc., to the management device or the like.

The storage unit 12 is an example of a storage device that stores data, programs executed by the controller 20, etc., and is, for example, a memory, a hard disk or the like. The storage unit 12 stores an input data database (DB) 13, a learning data DB 14, a setting value DB 15, and a learning result DB 16.

Figure 3:
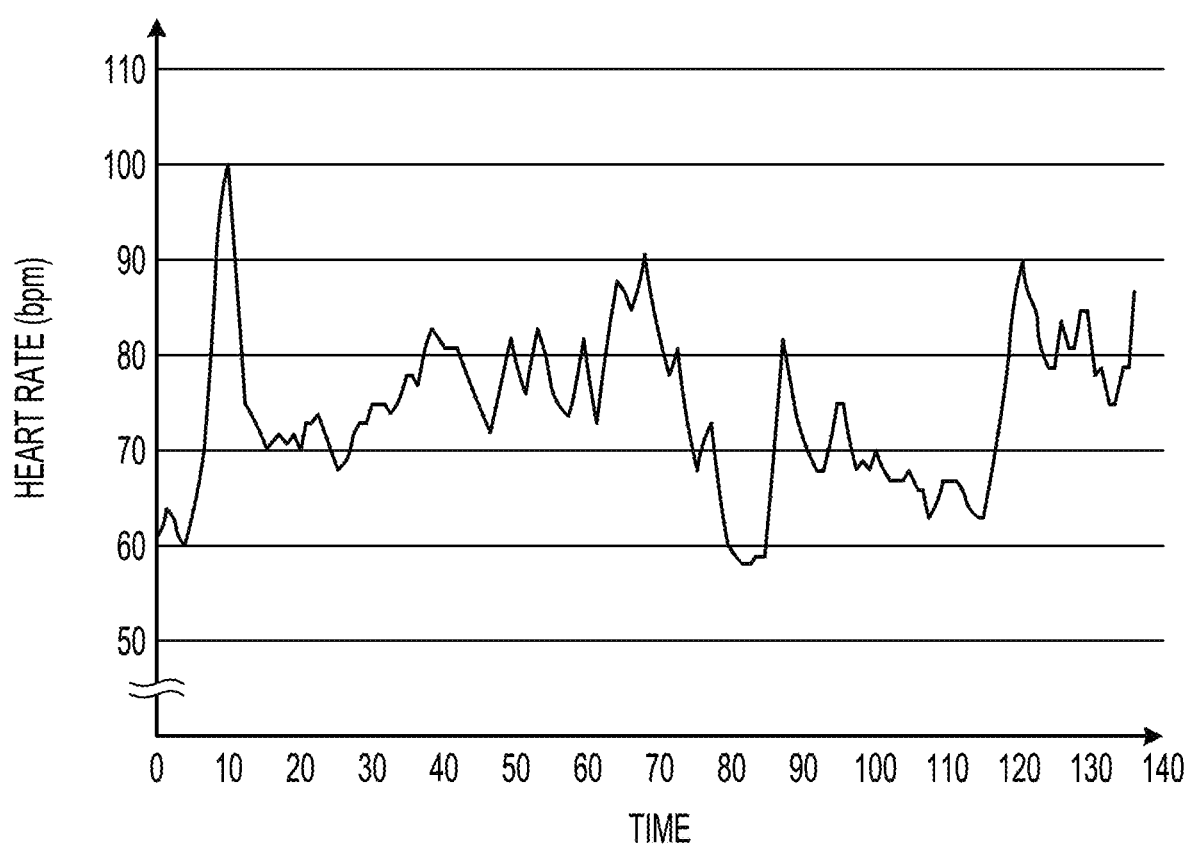
FIG. 3 is a view illustrating an example of time-series data.

The input data DB 13 stores input data having a periodic property. For example, the input data DB 13 stores time-series data representing a fluctuation of the heart rate. FIG. 3 is a view illustrating an example of time-series data. FIG. 3 illustrates time-series data representing a fluctuation of the heart rate, the vertical axis represents the heart rate (beats per minute), and the horizontal axis represents time.

Meanwhile, while FIG. 3 illustrates the time-series data of the heart rate as continuous data, the continuous data is not limited to the time-series data of the heart rate. For example, the continuous data may be biological data other than the heart rate (time-series data such as a brainwave, pulse or body temperature), data of a wearable sensor (time-series data of a gyro sensor, an acceleration sensor or a geomagnetic sensor), etc. In addition, the continuous data may be financial data (time-series data such as an interest rate, price, balance of payments or stock price), natural environment data (time-series data such as a temperature, humidity or carbon dioxide concentration), social data (data such as labor statistics or population statistics), etc.

The learning data DB 14 stores learning data used for learning a learning model. For example, the learning data DB 14 stores sampled data that is sampled, in other words, thinned out data from time-series data stored in the input data DB 13 at an appropriate interval.

The setting value DB 15 stores various setting values used for learning. For example, the setting value DB 15 stores a target period T, a dimension number DN of attractors, the number of generated random numbers N, etc.

The learning result DB 16 stores a learning result. For example, the learning result DB 16 stores a result of discrimination of learning data by the controller 20 (classification result), and various parameters learned by a machine learning or a deep learning.

The controller 20 is a processing unit that controls the entire process performed by the learning device 10, and is, for example, a processor or the like. The controller 20 includes a thinning execution unit 21, a sequence generator 22, a learning unit 23, and a discrimination unit 24. Meanwhile, the thinning execution unit 21, the sequence generator 22, the learning unit 23, and the discrimination unit 24 are an example of processes executed by electronic circuits or processors included in a processor or the like.

The thinning execution unit 21 is a processing unit that determines an appropriate thinning interval for suppressing oversampling and performs data thinning from input data at the determined thinning interval so as to generate learning data. Specifically, the thinning execution unit 21 generates a sine wave using a basic period of input data having a periodic property, and determines a sampling period based on the degree of roundness of an attractor generated from the sine wave. Then, the thinning execution unit 21 performs data thinning according to the determined sampling period.

Here, in the sine wave, the feature of shape is represented best when the attractor becomes a complete circle. When the expression of the sine wave is Equation (1), point sets that meet Equation (2) for arbitrary "t" are required in order to make the attractor become a complete circle. Meanwhile, when the attractor is three-dimensional, the attractor is a sphere in the equation, but the point sets in the sine wave are present on the circumference of the cross section that passes through the center of the sphere.

Equation (1)

$$x_t = A \sin(\omega t) \quad (1)$$

Equation (2)

$$r^2 = x_t^2 + x_{t+dt}^2 + x_{t+2dt}^2 \quad (2)$$

Then, the thinning execution unit 21 may obtain a relationship between a frequency and an optimum thinning interval dt by combining Equations (1) and (2) with each other. For example, the thinning execution unit 21 may adopt a method in which when the square of the radius "r" of the circle configured from attractors is obtained for multiple times "t", the interval dt at which the variance of the square of the radius $r^2$ becomes the smallest is searched for or automatically calculated. Meanwhile, in Equation (1), A is an amplitude, and ω is an angular frequency and may be expressed as, for example, "ω=(2(pi))/T". Further, "t" is time.

More specifically, when input data which is an analysis target includes periodic data, the thinning execution unit 21 performs a frequency analysis to determine the strength of frequency components included in the data. Then, the thinning execution unit 21 calculates a sampling period from the main frequency among the frequency components and the relational expression of Equations (1) and (2), so as to calculate an appropriate thinning interval.

Figure 4:
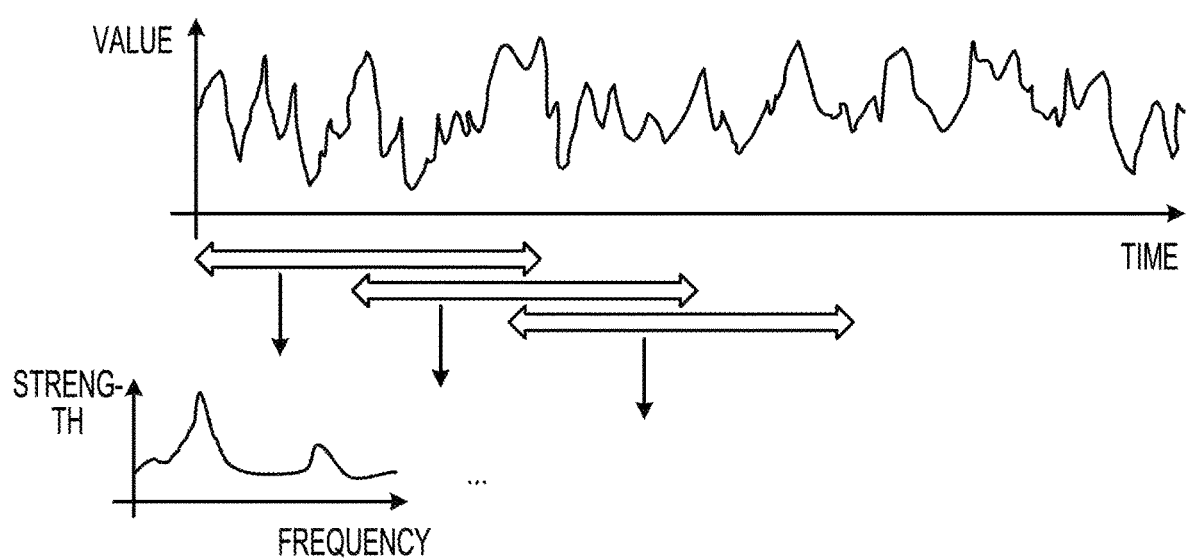
FIG. 4 is a view for explaining a method of obtaining a main frequency.

FIG. 4 is a view for explaining a method of obtaining the main frequency. As illustrated in FIG. 4, when obtaining the main frequency, the thinning execution unit 21 may calculate a frequency spectrum for each small time-series section describing an attractor to obtain a frequency with the highest strength, average the obtained frequencies over all the small sections, and take the average value as the main frequency. Then, the thinning execution unit 21 generates a sine wave according to the calculated frequency.

Subsequently, the thinning execution unit 21 calculates a thinning interval dt at which the attractor of $x_t$ becomes a complete circle. Specifically, the thinning execution unit 21 generates N number of (e.g., 1,000) random numbers $t_0$ to $t_{n-1}$ that meet 0≤t<T where N is a predetermined value, and selects data for sampling.

Then, the thinning execution unit 21 calculates Equation (3) using the dimension number DN of an attractor and calculates the square of the radius "r" of the attractor, for each "t". Subsequently, the thinning execution unit 21 calculates a variance value V of $r_t^2$ calculated for each "t". Then, the thinning execution unit 21 iterates the calculations until the variance value V becomes smaller than a previously calculated variance value V, and when the variance value V becomes smaller than a previous variance value V, the thinning execution unit 21 determines the dt used in the previous variance value V as the thinning interval.

Equation (3)

$$r_i^2 \sum_{j=1}^{DN} x_{t_j + j \ast dt}^2 \quad (3)$$

Figure 5:
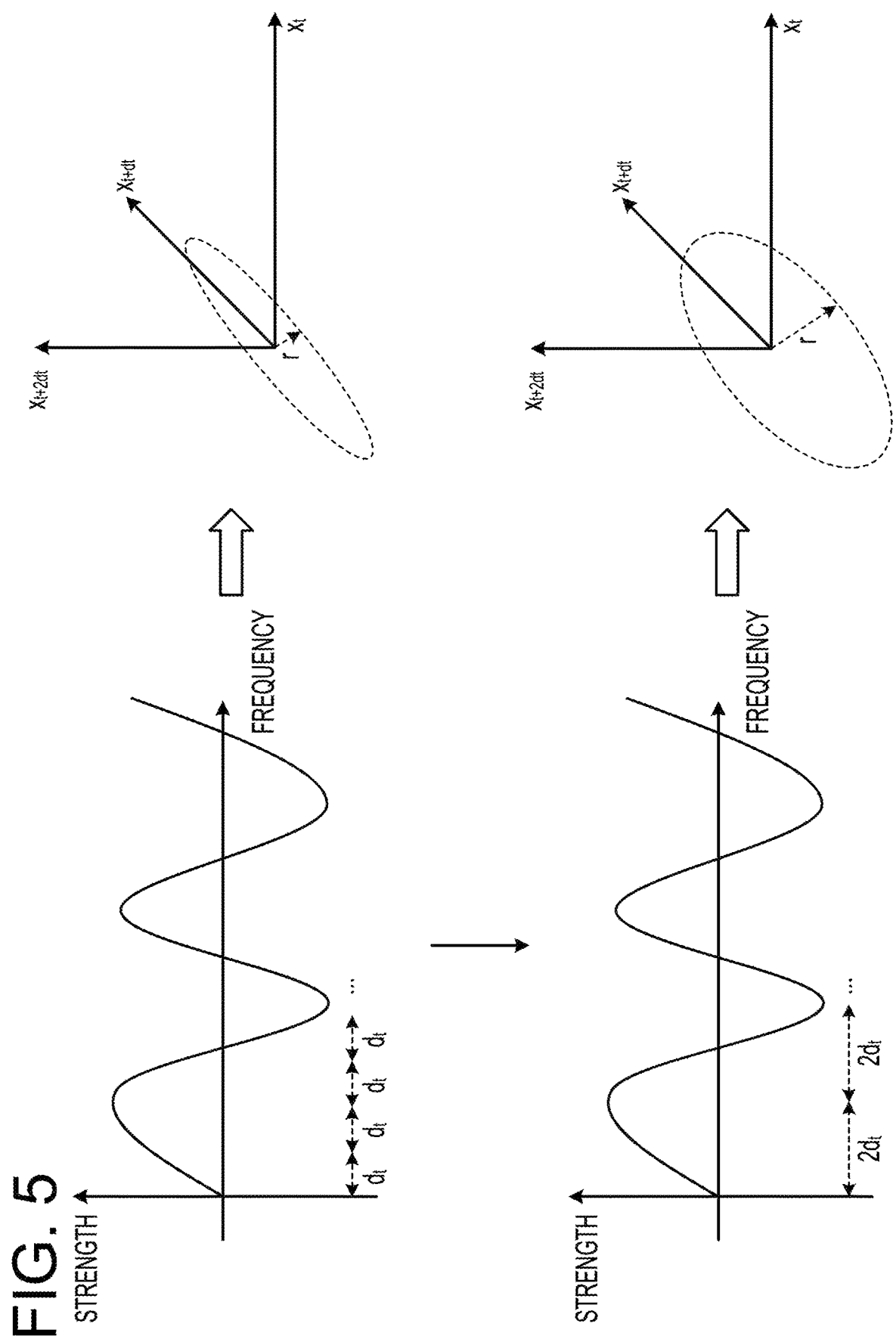
FIG. 5 is a view for explaining searching for an appropriate thinning interval.
Figure 6:
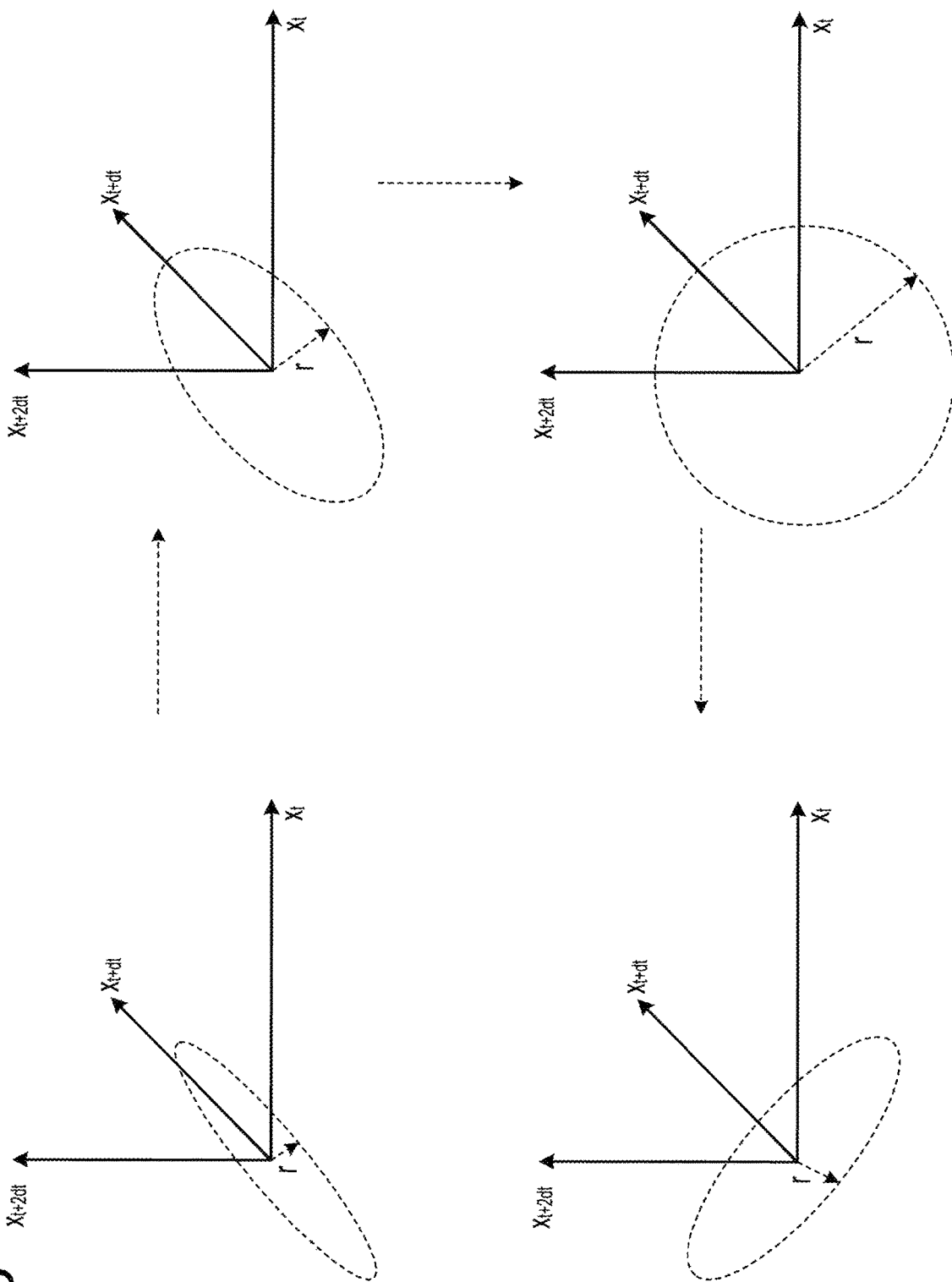
FIG. 6 is a view for explaining searching for an appropriate thinning interval.

Here, descriptions will be made on searching for the thinning interval described above, using FIGS. 5 and 6. FIGS. 5 and 6 are views for explaining searching for an appropriate thinning interval. As illustrated in FIG. 5, the thinning execution unit 21 extracts data at the thinning interval dt from the sine wave generated from the input data, and calculates the square $r^2$ of the radius "r" of the attractor having $x_t$, $x_{t+dt}$, and $x_{t+2dt}$ as dimensions. Subsequently, the thinning execution unit 21 changes the thinning interval from dt to 2dt, extracts data at the changed thinning interval from the sine wave, and calculates the square $r^2$ of the radius "r" of the attractor having $x_t$, $x_{t+dt}$, and $x_{t+2dt}$ as dimensions.

In this manner, the thinning execution unit 21 estimates the shape of the circle configured by the attractors using the radius "r" while changing the thinning interval dt from the sine wave. As illustrated in FIG. 6, the radius "r" gradually approaches the radius of a complete circle as the thinning interval dt increases, and moves away from the radius of the complete circle at a specific timing. Accordingly, the thinning execution unit 21 calculates the variance of the square $r^2$ of the radius "r" at each dt, and compares the variance value with a previous variance value, to determine the thinning interval dt corresponding to a complete circle.

Thereafter, the thinning execution unit 21 thins data out from the input data according to the determined thinning interval dt to generate learning data, and stores the learning data in the learning data DB 14.

Returning to FIG. 2, the sequence generator 22 is a processing unit that generates a Betti sequence which is a feature quantity used for learning, by the TDA. Specifically, the sequence generator 22 reads out the learning data stored in the learning data DB 14, generates multiple pseudo attractors from the learning data, and generates multiple Betti sequences based on Betti numbers obtained by performing a PH conversion on each of the multiple pseudo attractors. Then, the sequence generator 22 outputs each of the generated Betti sequences to the learning unit 23.

For example, the sequence generator 22 may generate the Betti sequences using a general method. For example, the sequence generator 22 equally divides the section $[r_{min}, r_{max}]$ of the radius for which Betti numbers are calculated, by m−1, and calculates a Betti number $B(r_i)$ in each radius $r_i$ (i=1, . . . , m), and generates a Betti sequence in which the Betti numbers are enumerated $[B(r_1), B(r_2), B(r_3), \ldots, B(r_m)]$.

Figure 7:
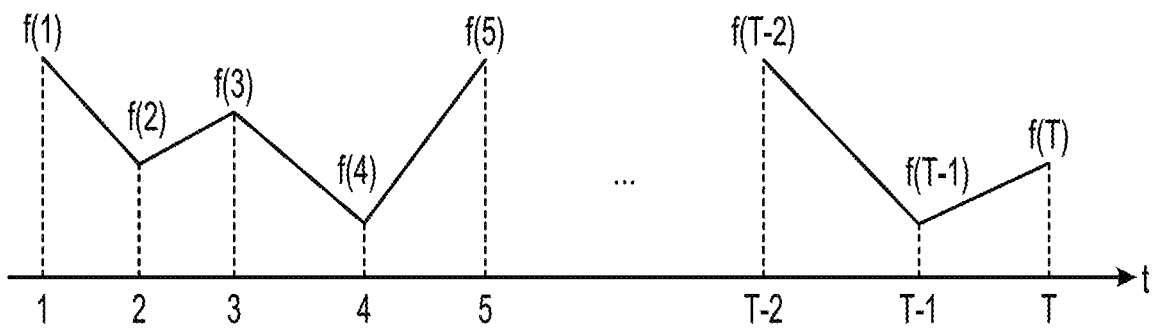
FIG. 7 is a view illustrating an example of time-series data of a learning target.

FIG. 7 is a view illustrating an example of time-series data which is a learning target. FIGS. 8A to 8D are views for explaining the persistent homology (PH). FIG. 9 is a view for explaining a relationship between barcode data and continuous data being generated.

Descriptions will be made on the generation of pseudo attractors using FIG. 7. For example, as illustrated in FIG. 7, continuous data represented by a function f(t) ("t" represents time) will be considered. Further, it is assumed that f(1), f(2), f(3), . . . , f(T) are given as actual values. In the present embodiment, the pseudo attractors are a cloud of points, in an N-dimensional space, that has values of N points taken at each delay time T (τ≥1) from the continuous data, as components. Here, N represents an embedding dimension, and generally, N=3 or 4. For example, when N=3 and T=1 pseudo attractors including (T−2) number of points are generated as follows.

Pseudo attractors={(f(1),f(2),f(3)),(f(2),f(3),f(4)),(f(3),f(4),f(5)), . . . ,(f(T−2),f(T−1),f(T))}

Subsequently, the sequence generator 22 generates the pseudo attractors and converts the pseudo attractors into Betti sequences by using the PH conversion. Meanwhile, considering that the attractors generated here are a cloud of finite points, the attractors are referred to as "pseudo attractors".

Here, the "homology" is a method of expressing the feature of a target with the number of m-dimensional holes ($m \geq 0$). Here, the "hole" is the origin of a homology group, a zero-dimensional hole is connected components, a one-dimensional hole is a hole (tunnel), and a two-dimensional hole is a void. The number of holes in each dimension is called a Betti number. In addition, the "persistent homology" is a method of characterizing a transition of an m-dimensional hole in a target (a point cloud, here), and the feature related to an arrangement of points may be studied by the persistent homology. In this method, each point in the target gradually swells in a sphere form, and during the course, a time when each hole appears (represented as a radius of a sphere at the time of the appearance) and a time when each hole disappears (represented as a radius of a sphere at the time of the disappearance) are determined.

Figure 8A:
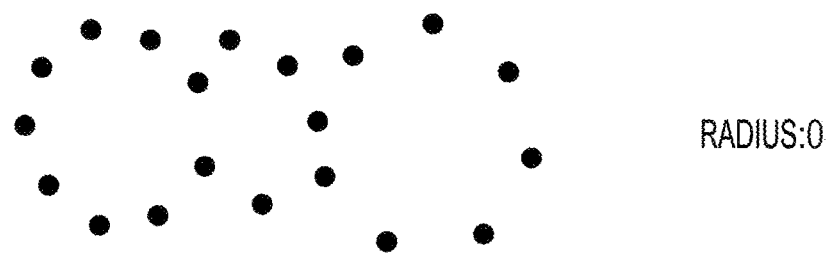
FIGS. 8A to 8D are views for explaining persistent homology.
Figure 8B:
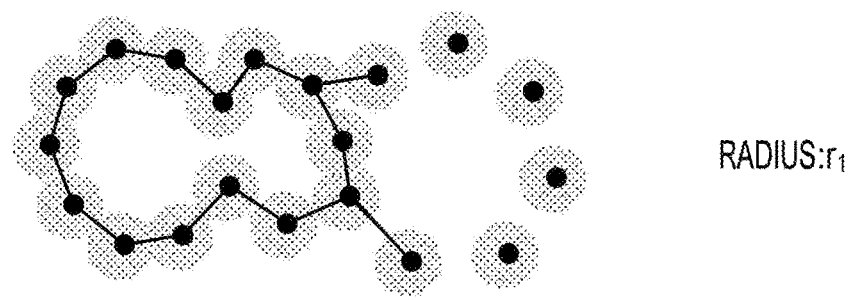
Figure 8C:
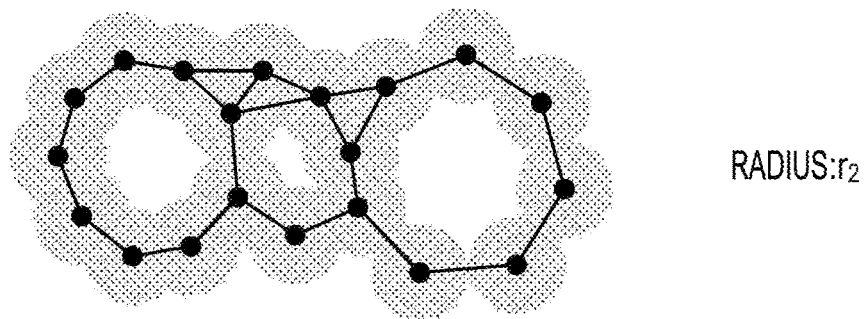
Figure 8D:
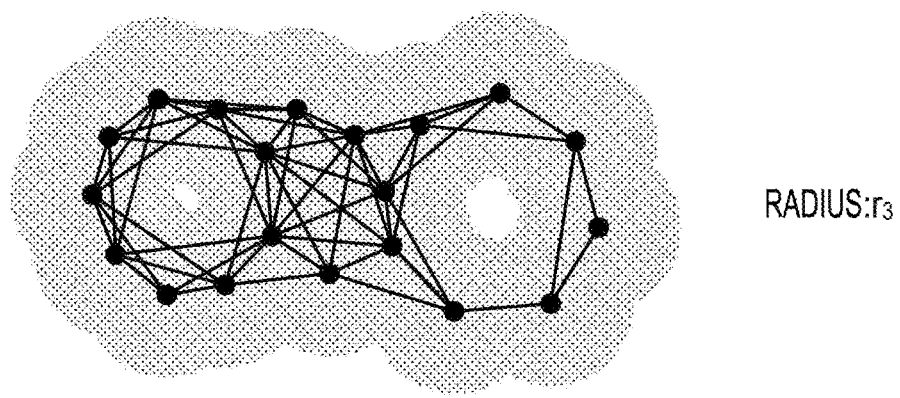
Figure 9:
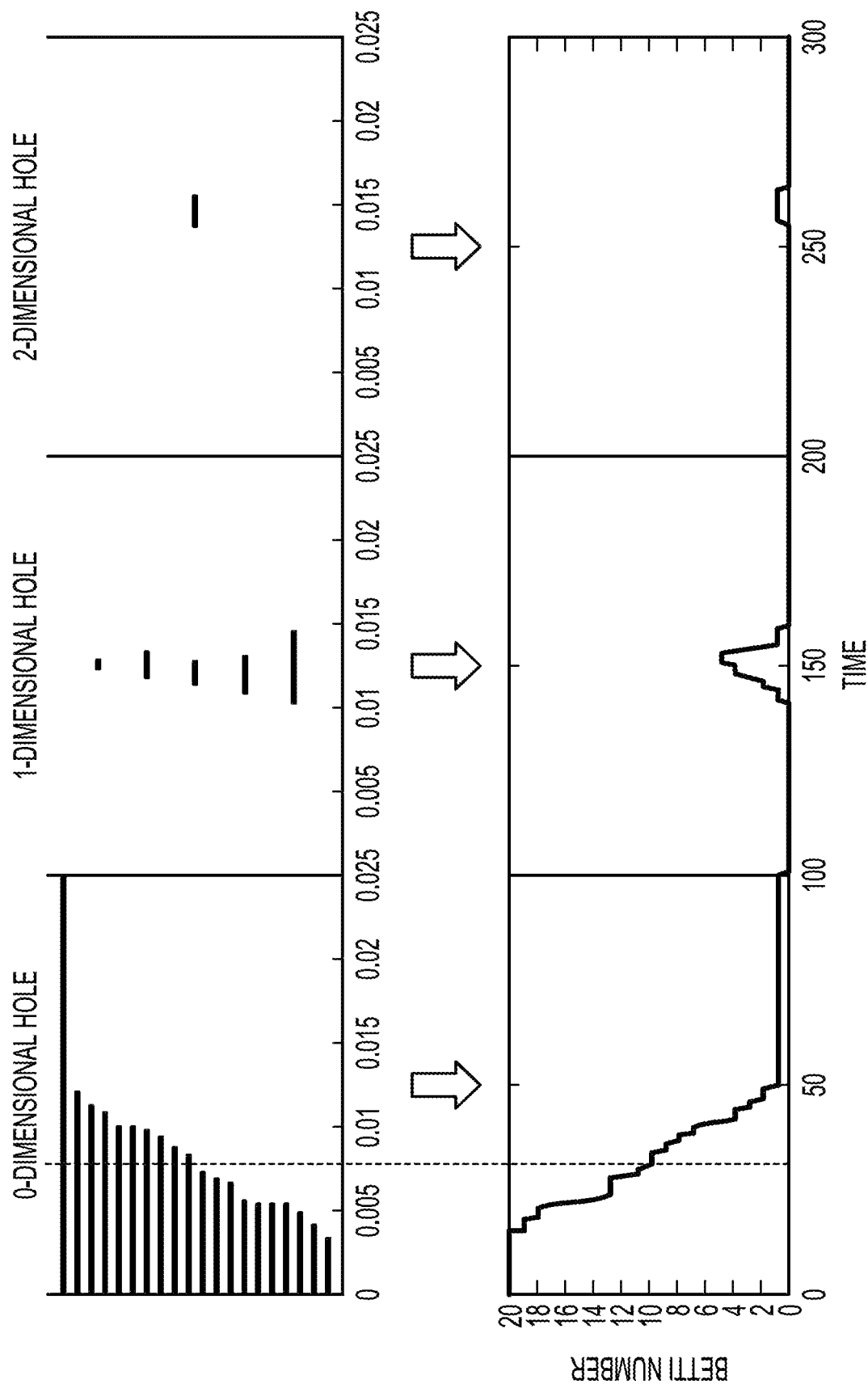
FIG. 9 is a view for explaining a relationship between barcode data and continuous data being generated.

The persistent homology will be more specifically described using FIGS. 8A to 8D. As a rule, when one sphere is neighbored, the centers of two spheres are connected by a line, and when three spheres are neighbored, the centers of the three spheres are connected by a line. Here, only connected components and holes will be considered. In the case of FIG. 8A (radius r=0), only connected components appear, and no hole appears. In the case of FIG. 8B (radius $r=r_1$), holes appear, and a portion of the connected components disappears. In the case of FIG. 8C (radius $r=r_2$), more holes appear, and only one connected component persists. In the case of FIG. 8D (radius $r=r_3$), the number of connected components remains one, and one hole disappears.

In the course of calculating the persistent homology, the appearance radius and the disappearance radius of the origin (i.e., the hole) of the homology group are calculated. By using the appearance radius and the disappearance radius of the hole, barcode data may be generated. Since the barcode data is generated for each hole dimension, a bunch of barcode data may be generated by integrating barcode data for multiple hole dimensions. The continuous data represents a relationship between the radius of a sphere (i.e., time) and a Betti number in the persistent homology.

Descriptions will be made on the relationship between the barcode data and the continuous data being generated, using FIG. 9. The upper graph is generated from the barcode data, and the horizontal axis represents the radius. The lower graph is generated from the continuous data (may be described as Betti sequences), the vertical axis represents a Betti number, and the horizontal axis represents time. As described above, the Betti number represents the number of holes. For example, since the number of holes being present at the radius corresponding to the dashed line in the upper graph is 10, the Betti number corresponding to the dashed line in the lower graph is also 10. The Betti number is counted for each block. Meanwhile, since the lower graph is a graph of pseudo time-series data, the value of the horizontal axis itself may not be meaningful.

The learning unit 23 is a processing unit that performs the learning process by taking the Betti sequences generated by the sequence generator 22 as an input, so as to generate a learning model. For example, the learning unit 23 performs a learning to be able to discriminate events of time-series data by extracting an abnormal candidate of time-series data based on the Betti numbers of the Betti sequences. That is, the learning unit 23 may classify the time-series data into an event A, an event B, etc., or detect a location of an occurrence of a different event from the other events in the time-series data.

Then, the learning unit 23 performs a learning by the DL or the like so as to be able to classify events from the feature quantities of time-series data, and stores the learning result in the learning result DB 16. The learning result includes a classification result (i.e., an output of the DL learning), and may include various parameters of a neural network for calculating an output from an input.

In addition, as the learning method, various methods such as unsupervised learning, supervised learning, semi-supervised learning, etc., may be adopted. For the unsupervised learning, a support vector machine (SVM) or the like may be used. The supervised learning may be performed in the manner that time-series data or time-series data corresponding to each period is associated with a label such as an event A, etc., a generated Betti sequence is set with the label given to the data that is the source of the generation of the Betti sequence, and the Betti sequence and the label are taken as an input.

The discrimination unit 24 is a processing unit that performs a discrimination of discrimination target data by using the learning model that has been learned. For example, the discrimination unit 24 reads parameters, etc., of the learning result from the learning result DB 16 to construct the learning model that has been learned. Then, the discrimination unit 24 performs the process of determining a thinning interval and the thinning process as described above, on the discrimination target data to generate thinned-out data. Thereafter, the discrimination unit 24 inputs the thinned-out data to the learning model that has been learned, and discriminates the discrimination target data based on an output result. For example, when an output result belongs to an event A of events A and B, the discrimination unit 24 classifies the data into the event A, and when the probability of the event A obtained as an output result is higher than the probability of the event B obtained as an output result, the discrimination unit 24 classifies the data into the event A. Meanwhile, the discrimination unit 24 may display the discrimination result in a display or the like or transmit the discrimination result to the management device.

<Flow of Entire Process>

Figure 10:
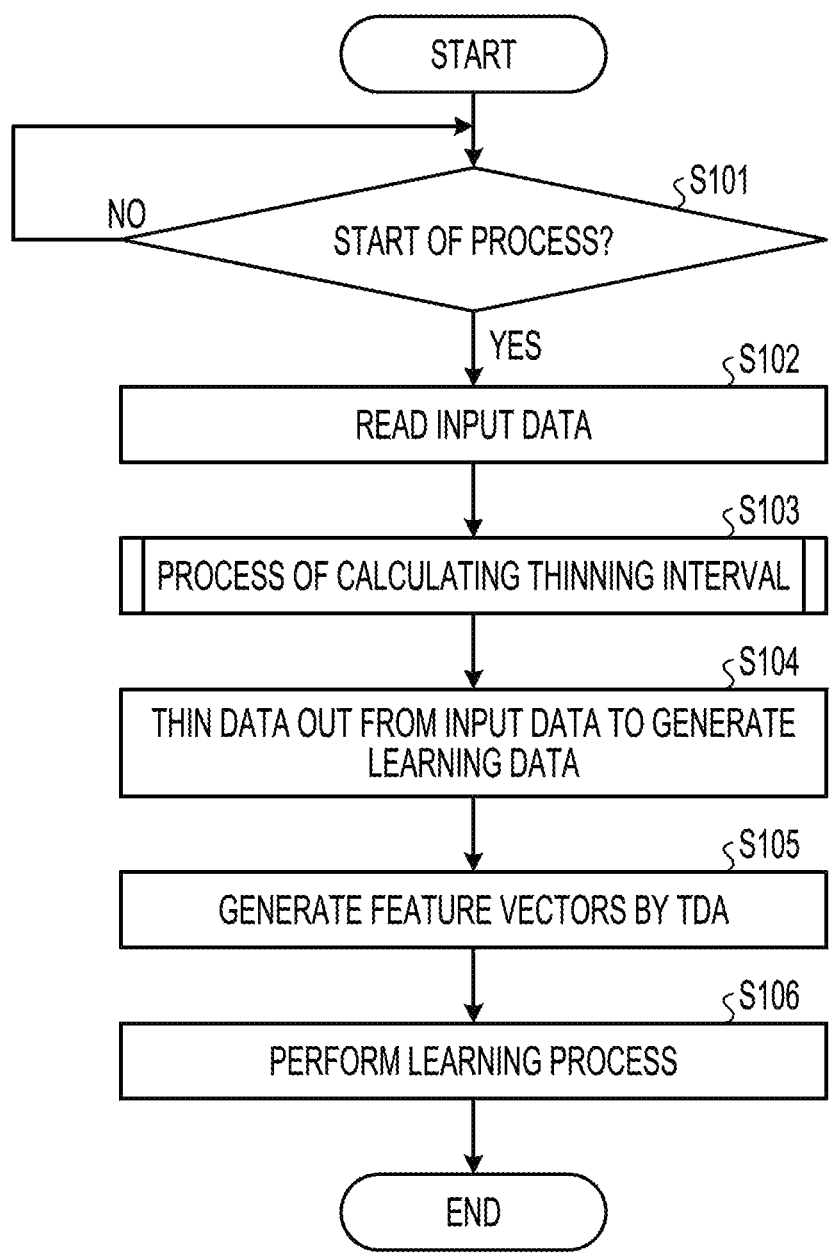
FIG. 10 is a flowchart illustrating the flow of an entire process.

FIG. 10 is a flowchart illustrating the flow of the entire process. As illustrated in FIG. 10, when it is instructed to start the process (S101: Yes), the thinning execution unit 21 reads input data (S102) and executes the process of calculating a thinning interval (S103).

Subsequently, the thinning execution unit 21 thins data out from the input data using the result of the calculation of the thinning interval and generates learning data (S104).

Thereafter, the sequence generator 22 generates feature vectors by the TDA (S105), and the learning unit 23 executes the learning process using the feature vectors by the TDA to generate a learning model (S106).

<Process of Calculating Thinning Interval>

Figure 11:
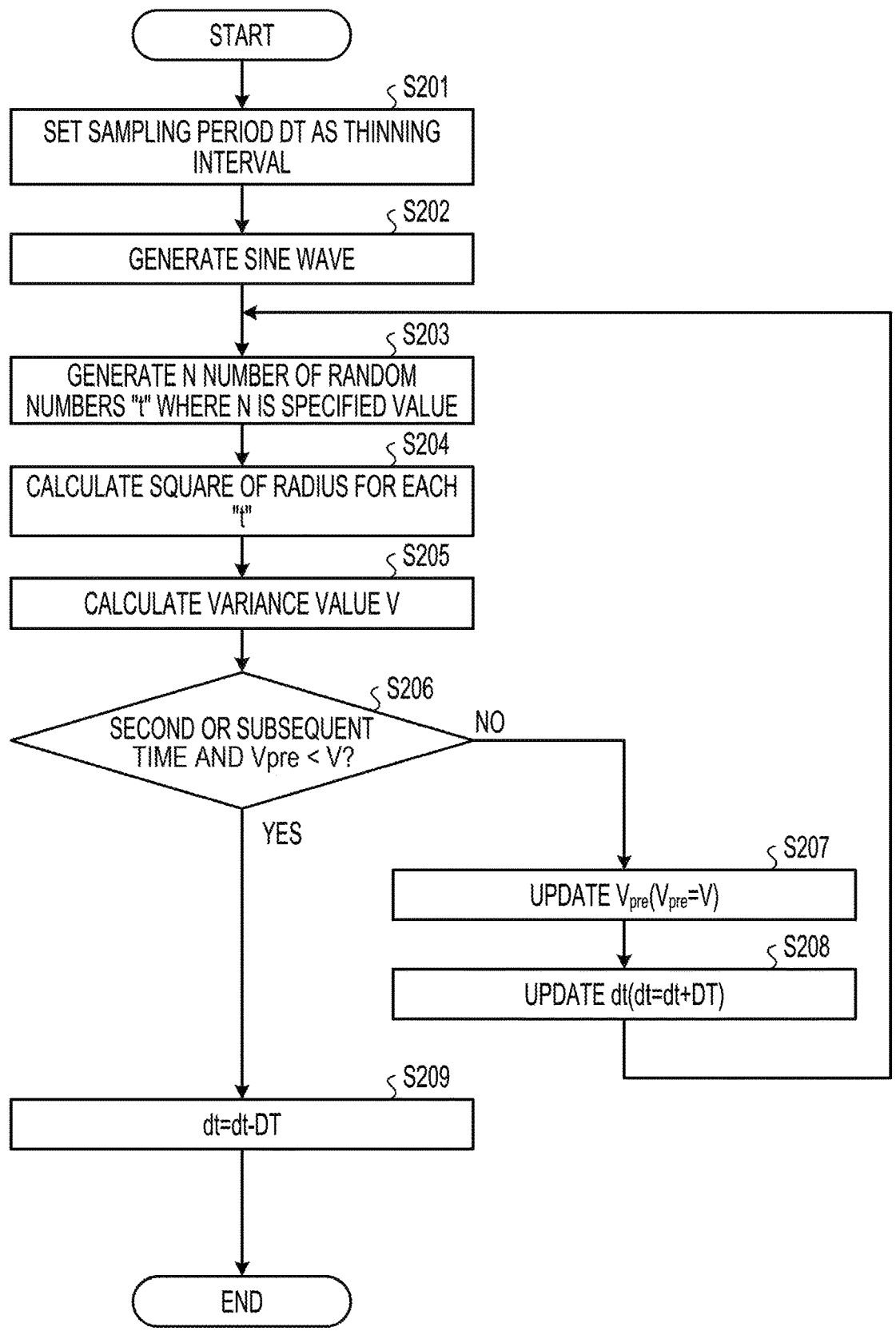
FIG. 11 is a flowchart illustrating the flow of a process of calculating a thinning interval.

FIG. 11 is a flowchart illustrating the flow of the process of calculating a thinning interval. Meanwhile, this process is executed in S103 of FIG. 10.

As illustrated in FIG. 11, the thinning execution unit 21 sets a sampling period DT in the initial value of the thinning interval dt (S201). Subsequently, the thinning execution unit 21 generates an expression of a sine wave of a designated period T (e.g., Equation (1)) (S202).

Then, the thinning execution unit 21 generates N number of random numbers $t_0$ to $t_{n-1}$ that meet $0 \leq t < T$ where N is a predetermined value (S203). Subsequently, the thinning execution unit 21 calculates the square of the radius using Equation (3) for each "t" (S204), and calculates the variation value V of the square of the radius (S205).

Then, when the variance value is calculated for the first time or when the calculated variance value V is equal to or smaller than a previous variance value $V_{pre}$ (S206: No), the thinning execution unit 21 updates the $V_{pre}$ with the currently calculated variance value V (S207), updates the thinning interval dt to "dt=dt+DT" (S208), and iterates S203 and subsequent steps thereof.

Meanwhile, when the second or subsequent calculation of the variance value is performed, and when the calculated variance value V is larger than the previous variance value $V_{pre}$ (S206: Yes), the thinning execution unit 21 updates the thinning interval dt to "dt=dt−DT" and sets the updated dt as the thinning interval.

<Effects>

As described above, since the learning device 10 may extract an appropriate sampling interval without performing a manual repetitive work, it is possible to suppress the adverse effect of the course of generating pseudo attractors on the machine learning, and speed up the analysis. Further, since the learning device 10 presents an appropriate sampling interval for a frequency to be focused, it is also possible to determine whether the sampling period of data is appropriate.

FIGS. 12A to 12C are views for explaining effects. As illustrated in FIG. 12A, when the thinning interval is appropriate, the oversampling is suppressed so that the concentration of similar data is suppressed, and the shape of pseudo attractors becomes circular. That is, when the pseudo attractors have a specific time "t" and subsequent times t+1 and t+2 as dimensions, and when the sampling is appropriate, it is possible to suppress the extraction of similar data at each time. Thus, as illustrated in FIG. 12B, when the shape of the pseudo attractors becomes circular, the change of the hole in the data point set may be appropriately extracted at the time of the PH conversion, so that the feature may be accurately extracted. Further, in the method according to the first embodiment, since the data set is distributed in a circular shape as illustrated in FIG. 12C, the feature may be accurately extracted.

Embodiment 2

While an embodiment of the present disclosure has been described, the present disclosure may be performed in various different forms, in addition to the embodiment described above.

<Data Type>

Figure 13:
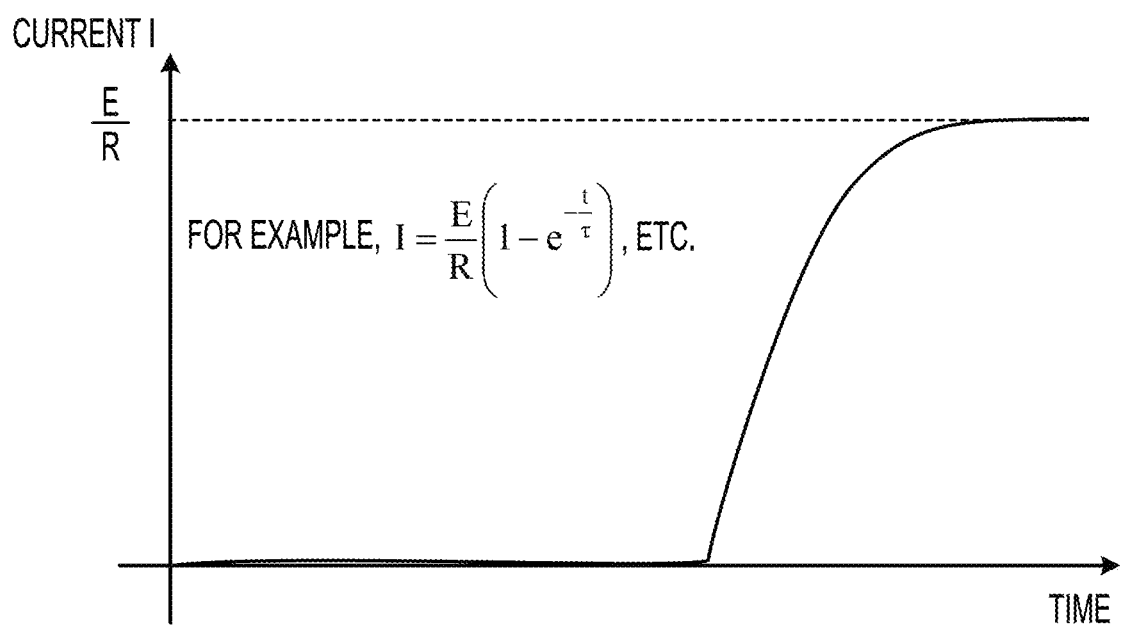
FIG. 13 is a view illustrating an example of non-periodic data.

In the above-described embodiment, descriptions have been made on an example where periodic data is used. However, the present disclosure is not limited thereto. FIG. 13 is a view illustrating an example of non-periodic data. Even in a case where data is not periodic and is stabilized at a value that fluctuates with time, in currents, etc., as illustrated in FIG. 13, for example, a reference frequency f=1/(2τ) may be calculated using the time constant and thus, the thinning interval may also be determined.

<Values, Etc.>

In addition, the numerical values, the setting contents of labels, the various setting values, the number of dimensions of the pseudo attractors, etc., used in the embodiment described above are merely examples, and may be arbitrarily modified. Further, the input data and the learning method are also merely examples and may be arbitrarily modified.

<System>

The processing procedure, control procedure, specific names, and information including various pieces of data and parameters described herein above and in the drawings may be arbitrarily modified unless otherwise specified.

In addition, each component of each illustrated device is functionally conceptual, and is not necessarily required to be configured physically as illustrated. That is, specific forms of distribution or integration of the respective devices are not limited to those illustrated. That is, all or a portion of the devices may be configured to be functionally or physically distributed or integrated in arbitrary units according to, for example, various loads or use conditions. For example, the learning process and the discrimination process may be implemented by separate devices.

In addition, all or an arbitrary portion of the processing functions performed in each device may be implemented by a CPU and programs analyzed and executed by the CPU, or may be implemented as hardware by a wired logic.

<Hardware>

Figure 14:
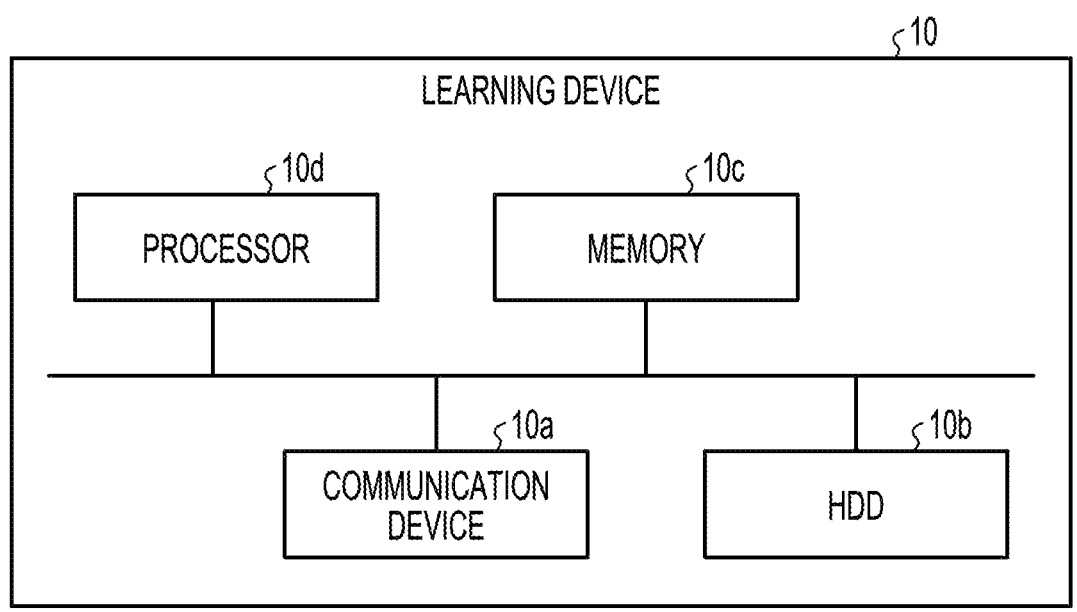
FIG. 14 is a view for explaining an example of a hardware configuration.

FIG. 14 is a view for explaining an example of a hardware configuration. As illustrated in FIG. 14, the learning device 10 includes a communication device 10a, an HDD (hard disk drive) 10b, a memory 10c, and a processor 10d. In addition, the units illustrated in FIG. 14 are connected to each other via a bus or the like.

The communication device 10a is a network interface card or the like, and communicates with another server. The HDD 10b stores programs for operating the functions illustrated in FIG. 2 and DBs.

The processor 10d reads out programs for executing the same processings as the respective processing units illustrated in FIG. 2, from the HDD 10b, etc., and develops the programs in the memory 10c, so as to operate the processes that execute the respective functions described in FIG. 2, etc, That is, the processes execute the same functions as the respective processing units of the learning device 10. Specifically, the processor 10d reads out programs having the same functions as the thinning execution unit 21, the sequence generator 22, the learning unit 23, the discrimination unit 24, etc., from the HOD 10b, etc. Then, the processor 10d executes the processes that execute the same processings as the thinning execution unit 21, the sequence generator 22, the learning unit 23, the discrimination unit 24, etc.

As described above, the learning device 10 reads out and executes the programs, so as to operate as an information processing apparatus that executes a learning method. In addition, the learning device 10 may read out the programs from a recording medium by a medium reading device, and execute the read-out programs, so as to implement the same functions as those in the embodiment described above, Meanwhile, the programs referred-to in other embodiments are not limited to those executed by the learning device 10. For example, the present disclosure may be similarly applied even when another computer or server executes the programs or when the computer or server executes the programs in cooperation with the learning device 10.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A method for analyzing time-series data, the method comprising:
generating, by a computer, a sine wave using a basic period of input data having a periodic property;
determining a sampling period based on a degree of roundness of an attractor, the attractor being generated from the sine wave, and the degree of the roundness of the attractor indicating a degree to which the attractor becomes a complete circle;
thinning data according to the determined sampling period to generate learning data;
generating pseudo attractors from the learning data;
performing a persistent homology (PH) conversion on each of the psuedo attractors to generate Betti sequences;
attractor; and
performing a learning process by taking the Betti sequences as an input to generate a machine learning model; and
discriminating events within the time series data using the machine learning model to detect an abnormality in the time-series data.

2. The method according to claim 1, further comprising:
setting intervals for extracting data;
extracting data from the sine wave by using each of the intervals;
generating an attractor for each of the intervals by using the extracted data; and
determining the sampling period based on the degree of roundness of the attractor that corresponds to each of the intervals.

3. The method according to claim 2, further comprising:
calculating a variance value of a radius of the attractor that corresponds to each of the intervals; and
determining, as the sampling period, an interval at which the variance value becomes smallest.

4. A non-transitory computer-readable recording medium having stored therein a program for causing a computer to execute a process, the process comprising:
generating a sine wave using a basic period of input data having a periodic property;
determining a sampling period based on a degree of roundness of an attractor, the attractor being generated from the sine wave, and the degree of the roundness of the attractor indicating a degree to which the attractor becomes a complete circle;
thinning data according to the determined sampling period to generate learning data;
generating pseudo attractors from the learning data;
performing a persistent homology (PH) conversion on each of the psuedo attractors to generate Betti sequences;
attractor; and
performing a learning process by taking the Betti sequences as input to generate a machine learning model; and
discriminating events within the time series data using the machine learning model to detect an abnormality in the time-series data.

5. An information processing apparatus comprising:
a memory; and
a processor coupled to the memory and the processor configured to:
generate a sine wave using a basic period of input data having a periodic property;
determine a sampling period based on a degree of roundness of an attractor, the attractor being generated from the sine wave, and the degree of the roundness of the attractor indicating a degree to which the attractor becomes a complete circle;
thin data according to the determined sampling period to generate learning data;
generate pseudo attractors from the learning data;
perform a persistent homology (PH) conversion on each of the psuedo attractors to generate Betti sequences;
attractor; and
perform a learning process by taking the Betti sequences as an input to generate a machine learning model; and
discriminate events within the time series data using the machine learning model to detect an abnormality in the time-series data.

6. The method according to claim 1, further comprising:
obtaining a frequency with a highest strength by analyzing a frequency spectrum for each time-series section of the input data;
averaging frequencies over all time-series sections; and
setting a basic period of the input data to an average frequency.

7. The method according to claim 1, further comprising:
estimating a shape of a circle configured by the attractor using a radius while changing an interval for extracting data from the sine wave.

8. The method according to claim 1, wherein the determining the sampling period determines the sampling period to suppress oversampling and an adverse effect relating to the oversampling to avoid manual repetitive work that requires time.

9. The method according to claim 1, wherein the time-series data is at least one of biological data, environmental data and social data.

* * * * *